(12) United States Patent
Benninger et al.

(10) Patent No.: US 9,571,157 B2
(45) Date of Patent: Feb. 14, 2017

(54) UTILITY COMMUNICATION METHOD AND SYSTEM

(71) Applicant: ABB Technology AG, Zürich (CH)

(72) Inventors: Hans Benninger, Turgi (CH); Dominique Cachin, Winterthur (CH); Romeo Comino, Horgen (CH)

(73) Assignee: ABB Schweiz AG, Baden (CH)

( * ) Notice: Subject to any disclaimer, the term of this patent is extended or adjusted under 35 U.S.C. 154(b) by 554 days.

(21) Appl. No.: 13/845,801

(22) Filed: Mar. 18, 2013

(65) Prior Publication Data

US 2013/0215765 A1    Aug. 22, 2013

Related U.S. Application Data

(63) Continuation of application No. PCT/EP2011/065989, filed on Sep. 15, 2011.

(30) Foreign Application Priority Data

Sep. 19, 2010   (EP) .................................... 10177513

(51) Int. Cl.
  *H04B 3/46*      (2015.01)
  *H02H 7/26*      (2006.01)
  (Continued)

(52) U.S. Cl.
  CPC ............... *H04B 3/46* (2013.01); *H02H 7/261* (2013.01); *H04B 3/542* (2013.01); *H04B 3/546* (2013.01);
  (Continued)

(58) Field of Classification Search
  None
  See application file for complete search history.

(56) References Cited

U.S. PATENT DOCUMENTS 6,198,402 B1 *   3/2001   Hasegawa et al. ........... 340/635
6,535,797 B1 *   3/2003   Bowles et al. ................ 700/286
(Continued)

FOREIGN PATENT DOCUMENTS

EP   2194656 A1   6/2010
EP   2211479 A1   7/2010
(Continued)

OTHER PUBLICATIONS

Kasztenny et al, IEC 61580—"A Practical Application Primer for Protection Engineers", Power systems Conference: Advanced Metering, Protection, Conrtrol, Communication, and Distributed Resources, Mar. 1, 2006, pp. 18-50.*
(Continued)

*Primary Examiner* — Robert C Scheibel
(74) *Attorney, Agent, or Firm* — Taft Stettinius & Hollister LLP

(57) ABSTRACT

Exemplary embodiments are directed to use of transparent transmission of teleprotection commands in the form of GOOSE or GSSE messages, as defined by the Generic Substation Event class model by the standard IEC 61850, between substations combined with Channel Supervision and Monitoring equivalent to CSM offered by known teleprotection equipment. This approach avoids the disadvantage of non-transparent transmission when using the gateway approach and of the lack of the CSM functionality when using the tunnelling approach.

13 Claims, 2 Drawing Sheets

(51) Int. Cl.
*H04B 3/54* (2006.01)
*H02J 13/00* (2006.01)
*H04L 12/26* (2006.01)

(52) U.S. Cl.
CPC ......... *H02J 13/0013* (2013.01); *H02J 13/0017* (2013.01); *H04B 2203/5408* (2013.01); *H04L 43/0811* (2013.01); *H04L 43/0858* (2013.01); *Y02E 60/723* (2013.01); *Y02E 60/725* (2013.01); *Y02E 60/7807* (2013.01); *Y02E 60/7892* (2013.01); *Y04S 10/16* (2013.01); *Y04S 10/20* (2013.01); *Y04S 40/12* (2013.01); *Y04S 40/146* (2013.01); *Y04S 40/168* (2013.01)

(56) References Cited

U.S. PATENT DOCUMENTS

| | | | | |
|---|---|---|---|---|
| 8,111,492 | B2* | 2/2012 | Lee et al. | 361/64 |
| 8,739,178 | B2* | 5/2014 | Bosold et al. | 719/313 |
| 2003/0081634 | A1 | 5/2003 | Higinbotham et al. | |
| 2003/0185150 | A1* | 10/2003 | Matsumoto et al. | 370/217 |
| 2011/0035065 | A1* | 2/2011 | Schweitzer et al. | 700/286 |

FOREIGN PATENT DOCUMENTS

| | | | |
|---|---|---|---|
| WO | WO 2009/062535 A1 | 5/2009 | |
| WO | WO 2010/081798 A1 | 7/2010 | |

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA/237) dated Mar. 28, 2013, issued in corresponding International Application No. PCT/EP2011/065989. (6 pages).
*International Search Report (PCT/ISA/210) issued on Nov. 22, 2011, by the European Patent Office as the International Searching Authority for International Application No. PCT/EP2011/065989.
*European Search Report issued Mar. 25, 2011 for European Application No. 10177513.8.
*Bogdan Kasztenny et al., IEC 61850—A Practical Application Primer for Protection Engineers, Power Systems Conference: Advanced Metering, Protection, Control, Communication, and Distributed Resources, Mar. 1, 2006, pp. 18-50.
*IEC/TR 61850-90-1 Ed1, Communication networks and systems for power utility automation—Part 90-1: Use of IEC 61850 for the communication between substations, 2009-03013, pp. 1-8.

* cited by examiner

UTILITY COMMUNICATION METHOD AND SYSTEM

RELATED APPLICATION(S)

This application claims priority as a continuation application under 35 U.S.C. §120 to PCT/EP2011/065989, which was filed as an International Application on Sep. 15, 2011 designating the U.S., and which claims priority to European Application 10177513.8 filed in Europe on Sep. 19, 2010. The content of each prior application is hereby incorporated by reference in its entirety.

FIELD

The disclosure relates to the field of utility communication, and particularly to communication of teleprotection commands between distant sites of an electric power utility enterprise.

BACKGROUND INFORMATION

Known electric power utilities or transmission system operators own and operate electric power transmission networks interconnecting sites, such as power sources and substations, which despite being distant from each other some 100 km or more, have to be coordinated in one way or the other. Across their utility communication systems, a variety of messages are exchanged over long distance communication links between distant sites of the utility in order to safely transmit and distribute electric energy. For some of these messages, and considering a specific implementation for teleprotection commands, the transmission delay between transmitter and receiver can be detrimental to the system and should not exceed a few milliseconds up to some 10 ms. For any time-sensitive application, increased transmission delay, or packet loss, can result in malfunction or even damage of a power system.

Teleprotection commands for known distance protection schemes in electrical power networks can be transmitted by remote tripping devices or protection signal transmission devices, also known as teleprotection devices, over dedicated point-to-point communication links. Physical signal links can involve radio waves or fiber optics, and in an exemplary embodiment, the protection signals can be transmitted over pilot wires, analog leased lines, voice channels of analog or digital communication systems, or even high-voltage electricity transmission lines, the latter being known as power line communication (PLC). Dedicated teleprotection systems permanently monitor the state of a communication system, for example, by means of dedicated loop test messages periodically exchanged.

For securely transmitting messages over long distances from one site to the other, the utility can also rely on a Wide-Area communication Network (WAN). In the present context, a WAN can be a dedicated point-to-point communication link between two sites based on e.g. optical fiber or pilot wires, a connection-oriented communication network with a guaranteed data rate such as Ethernet over SDH/HDLC, or a packet-oriented communication network interconnecting a number of sites of the utility, and comprising a plurality of specific network elements such as switches, repeaters and possibly optical transmission media at the physical layer.

WO 2010/081798 is directed to increased reliability of communication over a non-deterministic communication channel, and is suited for inter-substation teleprotection in electric power systems. A communication channel is being monitored based on regular network traffic, e.g., by evaluating data traffic, messages or data packets carrying real-time operational data as a payload. A permanent determination of a channel quality, including generating an alarm in case the channel quality is found insufficient, is based on an evaluation, at a receiving node, of data packets continually, or repeatedly, transmitted by a sending node. In packet oriented WANs, the repeatedly transmitted data packets can be considered as replacing a known guard signal in analogue teleprotection systems or known guard frames in digital teleprotection systems.

A communication standard for communication between the devices of a Substation Automation system has been introduced as part of the standard IEC 61850 entitled "communication networks and systems in substations". For the exchange of non-time sensitive messages within substations, IEC 61850-8-1 specifies the Manufacturing Message Specification (MMS, ISO/IEC 9506) protocol based on a reduced Open Systems Interconnection (OSI) protocol stack with the Transmission Control Protocol (TCP) and Internet Protocol (IP) in the transport and network layer, respectively, and Ethernet as physical medium. For the exchange of time-sensitive event-based messages within substations, IEC 61850-8-1 specifies the Generic Object Oriented Substation Events (GOOSE) and the Generic Substation State Events (GSSE) directly on the Ethernet link layer (OSI-Layer 2) of the communication stack. Hence, the standard defines a format to publish event-based messages as multicast messages on an industrial Ethernet. Notably, as in known IT communication networks with quasi-permanent traffic, the routers and switches of a substation do not provide for an intra-substation communication network supervision mechanism.

The IEC 61850 standard is concerned with communication systems and communication networks or Local Area Networks (LANs) within substations. Modelling of applications involving communication between substations such as teleprotection is thus outside the scope of the present version of the standard. In order to extend the concepts of the standard to the communication between substations, chapter 8 entitled "Communication Aspects" of the report IEC/TR 61850-90-1 (E) entitled "Communication networks and systems for power utility automation—Part 90-1: Use of IEC 61850 for the communication between substations" proposes two approaches.

FIG. 1 schematically shows two known inter-substation communication alternatives in accordance with known implementations.

As shown in FIG. 1, the known "tunneling" approach (FIG. 1, top), provides that messages are forwarded transparently, e.g., without any loss of information through message conversion at the interface between a LAN of a substation and the WAN connecting the substations. No loss of information implies that every bit of the original message is transmitted, which precludes e.g., stripping of Layer-2 MAC address by a router at the interface. This approach presumes the availability of sufficient bandwidth for transmission of an entire, uncompressed message according to IEC 61850 within a maximum time delay of the order of 10 ms. The tunneling approach models only the command transfer function of the teleprotection communication, but ignores the channel supervision and monitoring function that nevertheless form an important part of a known teleprotection communication.

The above-mentioned report IEC/TR 61850-90-1 (E) does not address any detail relating to implementation of the tunneling approach. As GOOSE/GSSE frames are multicast on OSI Layer-2, their transmission over Layer-3 or IP networks between substations is not entirely straightforward. Exemplary ways to implement tunneling in packet-oriented networks can comprise i) assigning the different substations to the same Layer-3 subnet and using Virtual Local Area communication Network VLAN identifiers to separate the intra-substation traffic from the inter-substation traffic, and to prevent the GOOSE/GSSE frames from flooding the subnet, ii) manual programming of the switches at the LAN/WAN boundary such that native Layer-2 GOOSE/GSSE frames with specific MAC source addresses, Ethertype protocol definition and/or VLAN-ID are forwarded to the WAN channel, or iii) using adapters or specially adapted switches for tunneling the unmodified GOOSE/GSSE frames encapsulated in Layer-3 packets over Layer-3 networks (e.g. Layer-2 tunneling protocol).

FIG. 1 also shows the known "gateway" approach (FIG. 1, bottom). The "gateway" approach provides that messages to be exchanged between the substations are modified for transmission over the WAN, in other words, the relevant information content is extracted from the intra-substation messages according to IEC 61850 and embedded in a different inter-substation message. Thus, from an IEC 61850 point-of-view, the message transmission is not transparent. For teleprotection applications, this approach allows using known teleprotection equipment, which incorporates channel supervision and monitoring functionality and which is designed to reliably and securely convey protection commands with low delay over communication channels with limited bandwidth such as radio links, copper wires or power line carriers. To this purpose, on the sending side of the WAN link, the commands should be extracted from the IEC 61850 messages carrying these commands, while on the receiving side, the original IEC 61850 messages should be reconstructed using the commands delivered by the teleprotection equipment and based on additional information configured or transmitted earlier and independently of the command.

SUMMARY

An exemplary method of transmitting teleprotection commands from a first substation to a second substation of an electric power network is disclosed, wherein the commands are exchanged as part of command messages within the two substations, comprising: transmitting the command messages transparently over an inter-substation channel from the first to the second substation; exchanging, in periods where no command messages are transmitted from the first to the second substation, Channel Supervision and Monitoring CSM messages between the two substations over the inter-substation channel; and evaluating the CSM messages in view of an availability of the inter-substation channel.

A teleprotection terminal adapted to be connected to an intra-substation communication network of a first substation of an electric power network and to an inter-substation communication network hosting an inter-substation channel is disclosed, comprising: a processor configured to receive command messages over the intra-substation communication network, transmit the command messages transparently over the inter-substation channel, insert, in-between two successive command messages, Channel Supervision and Monitoring (CSM) messages, and transmitting the CSM messages over the inter-substation channel.

An exemplary electrical power network including a first substation and a second substation configured to exchange teleprotection commands as part of command messages transparently over an inter-substation channel is disclosed, the network comprising: a teleprotection terminal connected to an intra-substation communication network of the first substation of an electric power network and to an inter-substation communication network hosting an inter-substation channel, the teleprotection terminal configured to receive the command messages over the intra-substation communication network at a base rate; transmit the command messages transparently over the inter-substation channel at the base rate; and insert, in-between two successive command messages, CSM messages at a rate exceeding the base rate.

BRIEF DESCRIPTION OF THE DRAWINGS

The subject matter of the disclosure will be explained in more detail in the following text with reference to preferred exemplary embodiments which are illustrated in the attached drawings, in which.

DETAILED DESCRIPTION

Figure 1:
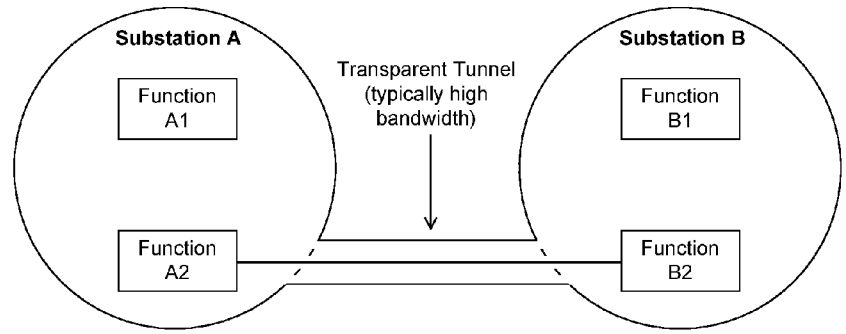
FIG. 1 illustrating two inter-substation communication alternatives in accordance with known implementations.
Figure 1:
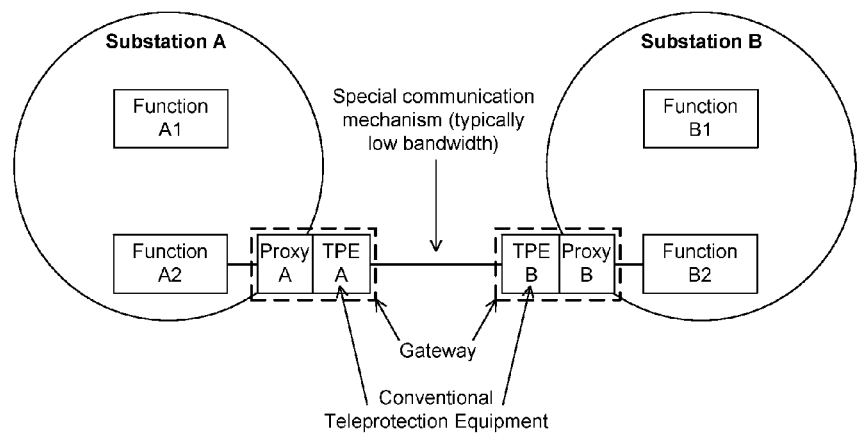

Exemplary embodiments of the present disclosure enable a utility, such as an electric power utility, to make efficient use of inter-substation communication networks for exchanging teleprotection commands between distant sites or substations of the utility.

According to an exemplary embodiment of the present disclosure, an inter-substation communication channel can be used for transparent transmission of GOOSE/GSSE messages according to the standard IEC 61850-8-1 and teleprotection or other inter-substation commands, and at the same time subjected to Channel Supervision and Monitoring (CSM). Supervising and monitoring the transparent communication channel by means of CSM functions equivalent to those of known teleprotection communication increases the reliability of and the confidence in the purposive use of such communication channels. Ultimately, the proposed approach avoids the disadvantage of non-transparent transmission of the gateway approach and the lack of the CSM functionality of the tunnelling approach.

In detail, in an exemplary method of transmitting teleprotection commands according to the present disclosure from a first substation to a second substation of an electric power network, the commands are exchanged or forwarded within respective intra-substation, or Local Area Network (LAN), communication networks of the two substations as part of, or embedded in, command messages such as IEC 61850 GOOSE/GSSE frames defined by the Generic Substation Event (GSE) class model of the standard IEC 61850. The entire, un-shortened command messages can be transmitted transparently, or integrally, through an inter-substation communication channel or path. In periods where no command messages are transmitted from the first to the second substation, CSM messages are exchanged between the two substations over the inter-substation channel. The CSM messages can be evaluated in view of channel availability in terms of an acceptable maximum delay of a few milliseconds up to some tens of milliseconds, as specified by the respective teleprotection application.

The CSM messages are part of an additional CSM functionality and can take the form of guard, unblocking or test messages that do not comprise (e.g., include) teleprotection command information or other information related to the operation of primary substation equipment. Nevertheless, repeated transmission of the CSM messages can alone be considered as a confirmation of the teleprotection command information comprised (e.g., included) in the latest GOOSE/GSSE message.

The inter-substation communication channel can traverse a Wide Area communication Network (WAN) and involve a known sequence of nodes. The WAN can be: i) a connection-oriented communication network with a number of inter-connected multiplexers (e.g., processors) as nodes; or ii) a packet-switched communication network, such as e.g., a Layer-2 network or a Layer-3 IP network with a number of interconnected switches or routers (e.g., processors) as nodes. Accordingly, the inter-substation communication channel with its constituting nodes, such as the abovementioned multiplexers or switches, is also termed "WAN channel" in the following. At each substation, an interface connects the WAN-channel to the LAN part of a Substation Automation system handling messages according to IEC 61850. The WAN channel is assigned sufficient bandwidth or transmission capacity for transparent transmission of the event-based IEC61850 messages carrying the teleprotection commands, such that the integral command messages are transmitted within a few ten milliseconds.

Figure 2:
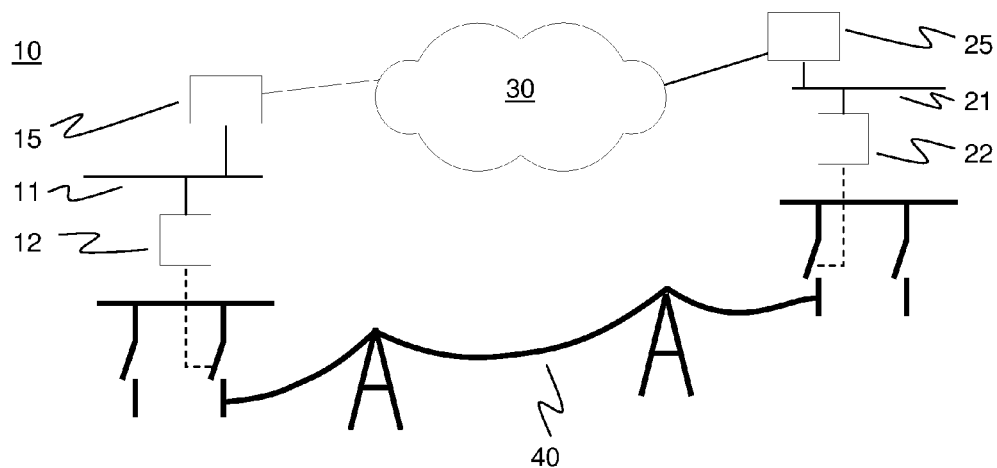
FIG. 2 illustrates an excerpt of an electric power transmission utility in accordance with an exemplary embodiment of the present disclosure.

FIG. 2 illustrates an excerpt of an electric power transmission utility in accordance with an exemplary embodiment of the present disclosure. As shown in FIG. 2, the electric power transmission utility includes a first substation 10, a second substation 20, an overhead power line 40 between the two substations 10, 20, and an inter-substation or Wide Area Network (WAN) communication network 30. In both substations, an intra-substation or Local Area Network (LAN) communication network 11, 21 interconnects substation secondary equipment, such as protection relays 12, 22, and enables an exchange of messages according to IEC 61850. Two teleprotection terminals 15, 25 are provided as interfaces between the LANs 11, 21 and the WAN 30. The protection relays 12, 22, in turn, are connected to the primary equipment of the substation and provide a signal or state to be transmitted, e.g., a teleprotection command such as a blocking, unblocking, permissive or direct tripping signal or other command related to a distance protection scheme on behalf of the power line 40 and resulting e.g. in a blocking, unblocking, permissive or direct tripping state of a switching device at the remote destination site.

Figure 3:
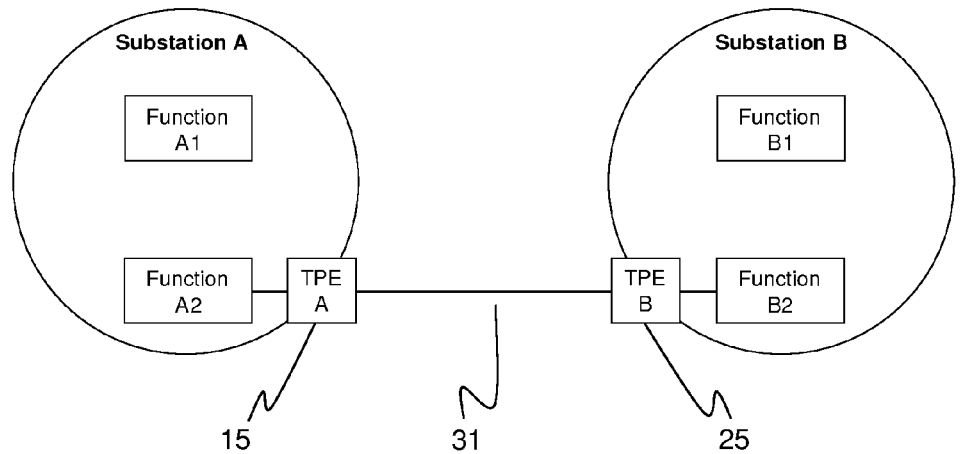
FIG. 3 illustrates a communication scheme in accordance with an exemplary embodiment of the present disclosure.

FIG. 3 illustrates a communication scheme in accordance with an exemplary embodiment of the present disclosure. As shown in FIG. 3 transparent exchange of command messages can be realized between teleprotection functions A2, B2. The respective interfaces at the two substations each include a teleprotection terminal 15, 25 that receives GOOSE/GSSE messages according to IEC 61850 over the respective substation LAN. Each terminal 15, 25 can transmit these messages in their entirety over the WAN channel 31 to the opposite terminal 25, 15, without in any way reducing the information content of the message, as originally stipulated in the tunneling approach according to IEC/TR 61850-90-1 (E). The teleprotection terminals are further adapted to generate and transmit Channel Supervision and Monitoring CSM messages (e.g., via a processor), as well as to receive and evaluate the latter on behalf of the WAN channel 31.

In case of a packet-oriented WAN communication network, the teleprotection terminals can include a Layer-2 switch with appropriate message filter functions connected to a Layer-2 WAN or a switch with appropriate message embedding functionality connected to an IP network with TCP or UDP as a Layer-3 WAN. GOOSE/GSSE frames to be forwarded by the teleprotection terminal can be identified according to specific MAC source addresses, Ethertype protocol definition and/or VLAN ID.

Figure 4:
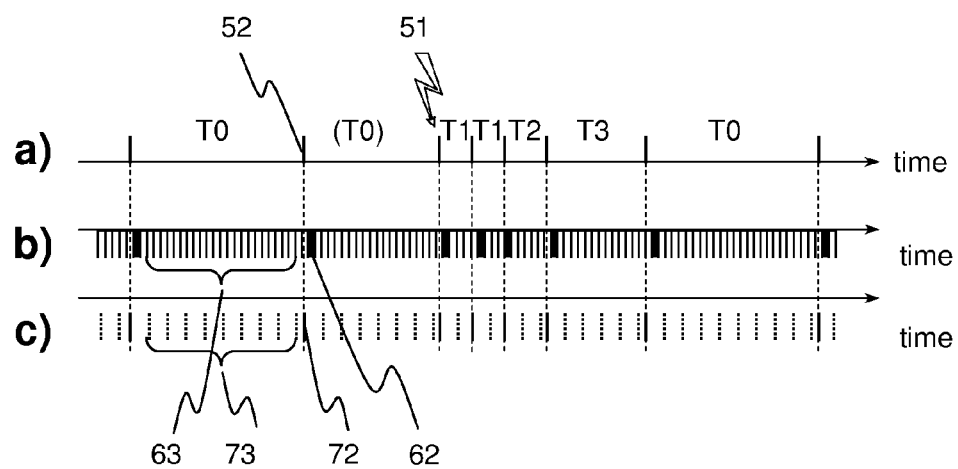
FIG. 4 illustrates exchanged messages over time in accordance with an exemplary embodiment of the present disclosure.

FIG. 4 illustrates exchanged messages over time in accordance with an exemplary embodiment of the present disclosure. As shown in FIG. 4, the top row indicated a), shows the GOOSE/GSSE messages 52 as being distributed by the functions A2, B2. According to the retransmission scheme of IEC 61850-8-1, the GOOSE/GSSE messages are repeated in time intervals T0 of 1 s, for example. The time T0 should be chosen sufficiently high such that in the multicast area of the substation LAN where the GOOSE/GSSE messages can be distributed any other IEC 61850 traffic is not affected and hence can circulate quasi-unhindered. Whenever due to an external event 51 the information in the data set carried by the GOOSE/GSSE messages changes e.g., as is the case at the beginning or end of a trip command, a series of GOOSE/GSSE messages can be generated at a short repetition interval T1 of a few ms, for example, thereby increasing the probability of successful reception of the messages at the cost of increasing the transmission load of the LAN. To reduce the load to the a low steady state level, the repetition interval is gradually increased to T2>T1, T3>T2, . . . until the steady state repetition interval T0 is reached again.

In FIG. 4, the middle row indicated b), shows the continuous serial bit stream carrying embedded GOOSE/GSSE messages 62 transferred by a connection-oriented WAN channel. In between the GOOSE/GSSE messages 62, CSM messages 63 are generated by the teleprotection terminal and transmitted continually with a repetition interval between 1 to 10 milliseconds. As there is no other data traffic over the WAN channel, the full transmission capacity of the WAN channel can be exploited by the messages 62, 63. The capacity of the WAN channel can thus be correspondingly reduced as compared to the capacity of the substation LAN, and as few as some 100 kB/s are sufficient to keep the transmission delay low. At the sending interface, the GOOSE/GSSE messages are duly marked within the serial bit stream, e.g. by adding start and stop bits before and after the message, a technique already known e.g. from "Ethernet over Synchronous Digital Hierarchy SDH" or "High-Level Data Link Control HDLC" for transmission and error-free reconstruction of Ethernet frames.

FIG. 4 also includes a bottom row indicated c), which shows messages 72, 73 carried by a packet-oriented WAN channel. The messages 72 are GOOSE/GSSE messages, e.g., either native Layer 2 GOOSE/GSSE messages in case of a Layer-2 WAN, or encapsulated as unmodified GOOSE/GSSE messages in a layer 3 transport protocol which enables routing in a Layer-3 WAN or IP network. In between, CSM messages 73 have been inserted in regular intervals of a few milliseconds, for example. The CSM repetition intervals are short enough to enable time sensitive CSM aspects such as unblocking without unduly adding communication load, as in contrast to connection-oriented channels, the messages 72, 73 should not occupy more than a small fraction of the total channel capacity, in order not to substantially hinder the remaining WAN traffic carried by the channel. In case of direct transmission of layer 2 GOOSE/GSSE messages, MAC source, Ethertype protocol definition and/or VLAN ID filtering are applied in the network device at the LAN/WAN boundary. In case of layer 3 encapsulation of the GOOSE/GSSE messages, standard layer 3 routing approaches apply.

The CSM functions produce additional messages such as guard, unblocking and test messages. The repeated transmission of the CSM messages can by itself be considered as a confirmation of the teleprotection command information comprised in latest GOOSE/GSSE message. Alternatively, this command information can be explicitly included in the CSM messages in the form of a few extra bits. Information generated by the CSM functions can be communicated within the substations to the clients under supervision of the respective human operators in charge, using known communication mechanisms and/or communication mechanisms such as notification (publish/subscribe), read (polling) or query. In another exemplary embodiment, channel quality information such as the time sensitive unblocking events can be transferred in the form of GOOSE or GSSE messages over the substation LAN.

The CSM messages are transmitted over the same inter-substation communication channel or WAN tunnel as the teleprotection commands hence both types of messages are forwarded by the same WAN nodes. To this effect, the teleprotection terminal maintain updated information as to the actual communication paths, including a table of all intermediary nodes of the WAN traversed by the respective messages.

The Channel Supervision and Monitoring (CSM) messages for teleprotection include the following measures:

a) The transmission of guard messages or signals in quiescent times, e.g., when no commands are being transmitted, and the continuous monitoring of the channel quality based thereupon. Failure to receive expected messages allows detection of channel interruptions or insufficient channel quality for successful command transmission within a few ms, upon which a so-called unblocking pulse can be issued to the receiving protection relay and an alarm can be raised for the duration of the interruption.

b) The exchange of test commands between the connected teleprotection devices. Such commands use the same message format as genuine commands, but do not activate any command output. Instead, the opposite device—upon receiving the test command—sends back a test response, allowing the first device to measure the loop delay time. If the latter is higher than a predetermined limit equivalent to e.g., two periods of the power network base frequency (40 ms), an alarm can be raised. A loop test can be initiated manually any time, or the equipment can be configured such that loop tests are performed at regular intervals, e.g., every few minutes or hours.

c) The provision of command counters counting the number of transmitted and received commands. These counters can be reset individually or altogether if specified.

d) The provision of an event recorder for storing all events which are relevant to reconstruct and analyze the sequence of events at a later time. The recorded events are stored together with time stamps in a non-volatile memory and can include:
transmitted or received commands,
sent, reflected and failed loop tests,
unblocking pulses,
changes of the equipments alarm state,
manipulation events such as resetting of command counters, setting of the real time clock, power up of the equipment.

e) The evaluation and logging of channel quality metrics such as Signal to Noise Ratio, Receive Level, Noise Level, Bit Error Rate, average transmission time, maximum transmission time, average packet jitter and/or maximum packet jitter. Such metrics can help to find the cause of communication problems.

In summary, exemplary embodiments disclosures herein provide use of transparent transmission of teleprotection commands in the form of GOOSE or GSSE messages, as defined by the Generic Substation Event (GSE) class model by the standard IEC61850-7-2, between substations combined with Channel Supervision and Monitoring (CSM) equivalent to CSM offered by teleprotection equipment. This approach avoids the disadvantage of non-transparent transmission when using the gateway approach and of the lack of the CSM functionality when using the tunnelling approach.

Thus, it will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

What is claimed is:

1. A method of transmitting teleprotection commands from a first substation to a second substation of an electric power network, wherein the commands are exchanged as part of command messages within the two substations, comprising:
transmitting the command messages transparently over an inter-substation channel from the first to the second substation; and
exchanging, after a command message is sent over the inter-substation channel, in periods where no command messages are transmitted from the first to the second substation, a controllably variable number of Channel Supervision and Monitoring CSM messages between the two substations over the inter-substation channel; and
evaluating the CSM messages in determining an availability of the inter-substation channel.

2. The method according to claim 1, wherein the CSM messages are guard or test messages devoid of teleprotection commands.

3. The method according to claim 1, comprising:
transmitting the command messages over an inter-substation channel of a connection-oriented or packet oriented inter-substation communication network.

4. The method according to claim 1, comprising:
recording time-stamped events including both beginning and end of teleprotection command messages as well as contents of CSM messages transmitted through the inter-substation channel.

5. The method of claim 1 wherein a timing between command messages is controllably variable by the first substation.

6. The method of claim 5 wherein the number of CSM messages is variable by the first substation in response to the variation of the time between the command messages.

7. The method of claim 5 wherein the time between the command messages is selectably decreased based upon a change of the command message.

8. A method of transmitting teleprotection commands from a first substation to a second substation of an electric power network, wherein the commands are exchanged as part of command messages within the two substations, the method comprising:

transmitting the command messages transparently over an inter-substation channel from the first to the second substation;

exchanging, in periods where no command messages are transmitted from the first to the second substation, Channel Supervision and Monitoring CSM messages between the two substations over the inter-substation channel; and evaluating the CSM messages in determining an availability of the inter-substation channel; and by a teleprotection terminal at an interface between an intra-substation communication network and an inter-substation communication network hosting the inter-substation channel;

receiving the command messages over the intra-substation communication network at a base rate;

transmitting the command messages transparently over the inter-substation channel at the base rate; and inserting, in-between two successive command messages, CSM messages at a rate exceeding the base rate.

9. A teleprotection terminal adapted to be connected to an intra-substation communication network of a first substation of an electric power network and to an inter-substation communication network hosting an inter-substation channel, comprising:

a processor configured to receive command messages over the intra-substation communication network, transmit the command messages transparently over the inter-substation channel, insert, in between two successive command messages and after transmission of a first of the two successive command messages, a selectable number of Channel Supervision and Monitoring (CSM) messages, and transmitting the CSM messages over the inter-substation channel.

10. The teleprotection terminal of claim 9 wherein a period between the transmissions of command messages is variable by the processor.

11. The teleprotection terminal of claim 10 wherein the selectable number of CSM messages is selected by the processor based on the variation of the period between the multiple transmissions.

12. The teleprotection terminal of claim 11 wherein the period between the command messages is selectably varied based upon a change in the command message.

13. An electrical power network including a first substation and a second substation configured to exchange teleprotection commands as part of command messages transparently over an inter-substation channel, the network comprising:

a teleprotection terminal connected to an intra-sub station communication network of the first substation of an electric power network and to an inter-substation communication network hosting an inter-substation channel, the teleprotection terminal configured to receive the command messages over the intra-substation communication network at a base rate; transmit the command messages transparently over the intersubstation channel at the base rate; and insert, in-between two successive command messages, CSM messages at a rate exceeding the base rate.

* * * * *